US009870478B1

(12) United States Patent
Takayama

(10) Patent No.: US 9,870,478 B1
(45) Date of Patent: *Jan. 16, 2018

(54) DATA PROTECTION FOR STORAGE DEVICE

(71) Applicant: International Business Machines Corporation, Armonk, NY (US)

(72) Inventor: Masao Takayama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/227,273

(22) Filed: Aug. 3, 2016

(51) Int. Cl.
*G06F 7/04* (2006.01)
*G06F 21/60* (2013.01)
*G06F 21/31* (2013.01)

(52) U.S. Cl.
CPC ............ *G06F 21/604* (2013.01); *G06F 21/31* (2013.01); *G06F 2221/2103* (2013.01); *G06F 2221/2143* (2013.01)

(58) Field of Classification Search
CPC ................. G06F 21/6218; G06F 21/31; G06F 2221/2103
USPC .......................................................... 726/18
See application file for complete search history.

(56) References Cited

U.S. PATENT DOCUMENTS

| 8,677,203 B1* | 3/2014 | Shalvi ..................... G06F 11/14 714/723 |
| 2006/0156052 A1 | 7/2006 | Bodnar et al. |
| 2007/0153580 A1* | 7/2007 | Luft ....................... G06F 21/606 365/185.19 |
| 2008/0098172 A1* | 4/2008 | Tsang ..................... G06F 21/554 711/115 |
| 2008/0136737 A1 | 6/2008 | Fratti et al. |
| 2008/0175567 A1* | 7/2008 | Watanabe ........ G11B 20/00086 386/259 |
| 2009/0106517 A1 | 4/2009 | Wang |
| 2009/0138727 A1 | 5/2009 | Campello de Souza |
| 2010/0205154 A1 | 8/2010 | Beliczynski |
| 2012/0260100 A1 | 10/2012 | Applegate |
| 2015/0030140 A1 | 1/2015 | Abel |

FOREIGN PATENT DOCUMENTS

| CN | 201716998 U | 1/2011 |
| CN | 202049754 U | 11/2011 |

OTHER PUBLICATIONS

Takayama et al., "Data Protection for Storage Device", U.S. Appl. No. 15/410,941, filed Jan. 20, 2017, 27 pages.
IBM Appendix P, list of patents and patent applications treated as related, Jan. 20, 2017, 2 pages.

* cited by examiner

*Primary Examiner* — Mohammad W Reza
(74) *Attorney, Agent, or Firm* — Steven F. McDaniel

(57) ABSTRACT

A method for protecting data on a first storage device from unauthorized access is provided. The method includes copying a data map, such as a file allocation table, from the first storage device, on which the data to be protected resides, to a second storage device. A security key is established for the data map. The data map is then deleted from the first storage device, to render unusable the data thereon. The data map is restored to the first storage device upon successful input of the security key.

13 Claims, 9 Drawing Sheets

DATA PROTECTION FOR STORAGE DEVICE

BACKGROUND OF THE INVENTION

The present invention relates generally to the field of data security, and more specifically to a method of rendering the data unusable in a storage device in the absence of a proper security key.

Known methods of protecting data from unauthorized access include the use of various forms of encryption by which the data is transformed into an unusable form. Upon reception of a correct (valid) security key, the data is transformed back into its original form whereupon it is again usable. Encryption is performed by software and/or hardware. In some implementations, data is encrypted/decrypted "on the fly" as it is stored and/or retrieved from a storage medium such as a hard disk.

A storage device, such as a USB flash drive, has many addressable storage locations (blocks). The storage is managed and organized by a file system. For example, an 8-gigabyte drive, may have at least two million 4-kilobyte blocks in its address space. A 1-megabyte file, for example, would occupy at least 250 (4-kilobyte) blocks, scattered throughout the two million blocks. The file system keeps track of all 250 blocks of storage associated with the file (as well as any other data stored within the remainder of the two million blocks). This means keeping track of: (i) the addresses of all 250 blocks; and (ii) the proper sequential order in which the blocks belong in the file. A commonly used file system uses a file allocation table (FAT, sometime referred to herein as a data map) to manage and organize the storage.

SUMMARY

According to one aspect of the present invention, a method, computer program product and/or system that performs the following operations (not necessarily in the following order) is provided. The method includes copying a data map, such as a file allocation table, from a first storage device, on which the data to be protected resides, to a second storage device. A security key is established for the data map. The data map is then deleted from the first storage device, to render unusable the data thereon.

DETAILED DESCRIPTION

Some embodiments of the present invention are directed to systems, methods, software and/or apparatus that provides security of data on a primary storage device (for example a USB flash drive), from unauthorized access. The data and its corresponding data map (for example its file allocation table (FAT)), without which the data is unusable, are separated and stored on separate devices. A security key is established, either automatically, or based on user input. Upon receipt of a correct security key, the data and the corresponding FAT are rejoined, restoring the data and making it usable again.

The present invention will now be described in detail with reference to the Figures.

Figure 1:
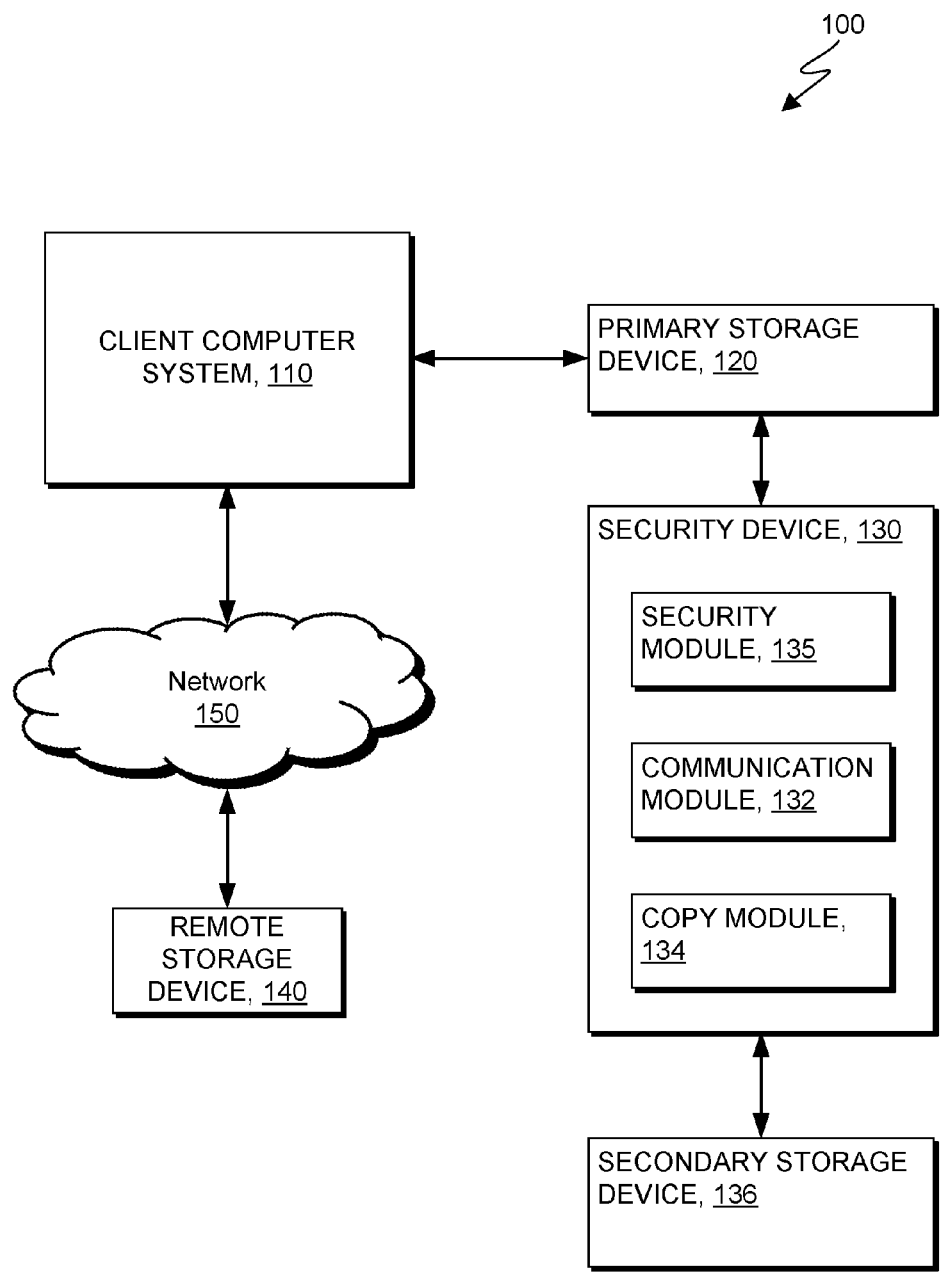
FIG. 1 is a functional block diagram depicting a computing environment in accordance with some embodiments of the present invention.

FIG. 1 is a functional block diagram depicting a computing environment 100 in accordance with an embodiment of the present invention. Computing environment 100 includes: client computer system 110; primary storage device 120, also sometimes herein referred to as primary storage 120; security device 130; communication module 132; copy module 134; security module 135; secondary storage device 136, also sometimes herein referred to as secondary storage 136; remote storage device 140, also sometimes herein referred to as remote storage 140; communications network 150. Client computer system 110 can be any of a desktop computer, a laptop computer, a specialized computer server, or any other computer system known in the art. In some embodiments, client computer system 110 represents a computer system utilizing clustered computers and components to act as a single pool of seamless resources when accessed through network 150. In general, client computer system 110 is representative of any electronic device, or combination of electronic devices, capable of executing machine-readable program instructions, as described in greater detail with regard to FIG. 8.

In the embodiment of FIG. 1, security device 130 includes communication module 132, copy module 134, and security module 135. Security module 135 is configured to perform at least some of the operations of methods in accordance with the present invention. In some embodiments of the present invention, security module 135 resides outside security device 130, such as: (i) in primary storage device 120; (ii) on client computer system 110; (iii) in other places or devices not shown in the figures; and/or (iv) distributed among multiple storage and/or computing devices, including devices shown and not shown in the figures.

Many types of memory devices are contemplated in embodiments of the present invention, including memory devices that store and deliver data through: (i) electrical connections; (ii) optical connections; (iii) wireless transmission; and/or (iv) any other data communications method known or to be developed in the future.

However, for the sake of clear description, unless stated otherwise, discussion herein will focus on: (i) a USB flash drive as the primary storage device; and (ii) a cap that couples with the USB flash drive, physically, electrically, optically, and/or operationally. Discussion directed to a USB flash drive is to be understood as applying to any other suitable storage device. Similarly, discussion directed to a cap that couples with the USB flash drive is to be understood as applying to any other suitable storage device. A USB flash drive, unless stated otherwise, is to be considered as a primary storage device. A cap that couples with the USB flash drive, unless stated otherwise, is to be considered as a secondary storage device. Further, and again for the sake of clear description, unless stated otherwise, discussion herein directed to a file allocation table (FAT) is to be understood as applying to any other data mapping system by which data on a storage device is organized and made addressable. While discussion herein focuses on file allocation tables and FAT file systems, embodiments of the present invention may be equally applicable to other file systems both proprietary and open, including various versions of FAT (such as FAT12, FAT16, FAT32, etc.), optical disc file systems (such as ISO 9660 and Universal Disk Format (UDF), etc.), flash file systems, tape file systems, database file systems, UNIX and UNIX-like file systems, and/or any other file system now known or to be developed in the future.

Figure 2A:
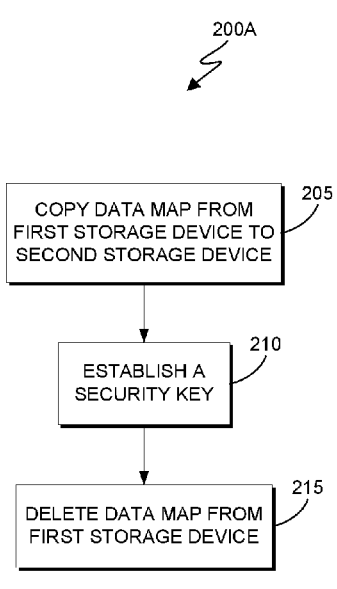
FIG. 2A is a flowchart depicting a method for securing data in accordance with embodiments of the present invention.

Flowchart 200A of FIG. 2A depicts a method for securing data in accordance with some embodiments of the present invention. Processing begins at operation 205 where security module 135 of security device 130 (see FIG. 1) copies a data map (for example, a file allocation table, also referred to as a FAT) from a first storage device to a second storage device. In some embodiments of the present invention, the first storage device is a USB flash drive and the second storage device is a cap that operationally couples (for example, mechanically, electrically, optically and/or wirelessly) with the flash drive.

Processing proceeds at operation 210 where a security key is established (for example by security module 135, see FIG. 1). In some embodiments of the present invention, the security key is a password. The security key may be chosen by a user, assigned by the security module or established by other means. In some embodiments, the security key may be a series of button presses and/or positioning of a selector dial, a biometric scan, etc. Some embodiments are discussed below with reference to FIGS. 6A and 6B.

Processing proceeds at operation 215 where security module 135 (see FIG. 1) proceeds to delete (or at least initiate deletion of) the data map from the first storage device. Without the data map, the file system is unable to recover files from storage in the first storage device.

Figure 2B:
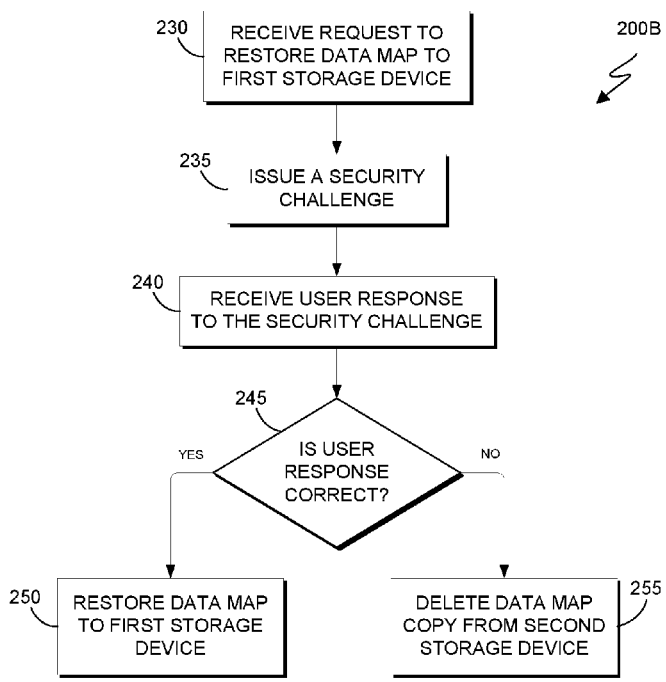
FIG. 2B is a flowchart depicting a conditional data restoration method in accordance with some embodiments of the present invention.

Flowchart 200B of FIG. 2B depicts a conditional data restoration method in accordance with some embodiments of the present invention. Processing begins at operation 230 where security module 135 (see FIG. 1) receives a request to restore a data map to a first storage device. In one embodiment, a user interacts with a user interface built into the second storage device (for example, the cap of a USB flash drive), to request restoration of the FAT to the flash drive.

Processing proceeds at operation 235 where security module 135 (see FIG. 1) issues a security challenge via the user interface built into the cap of the flash drive.

Figure 3:
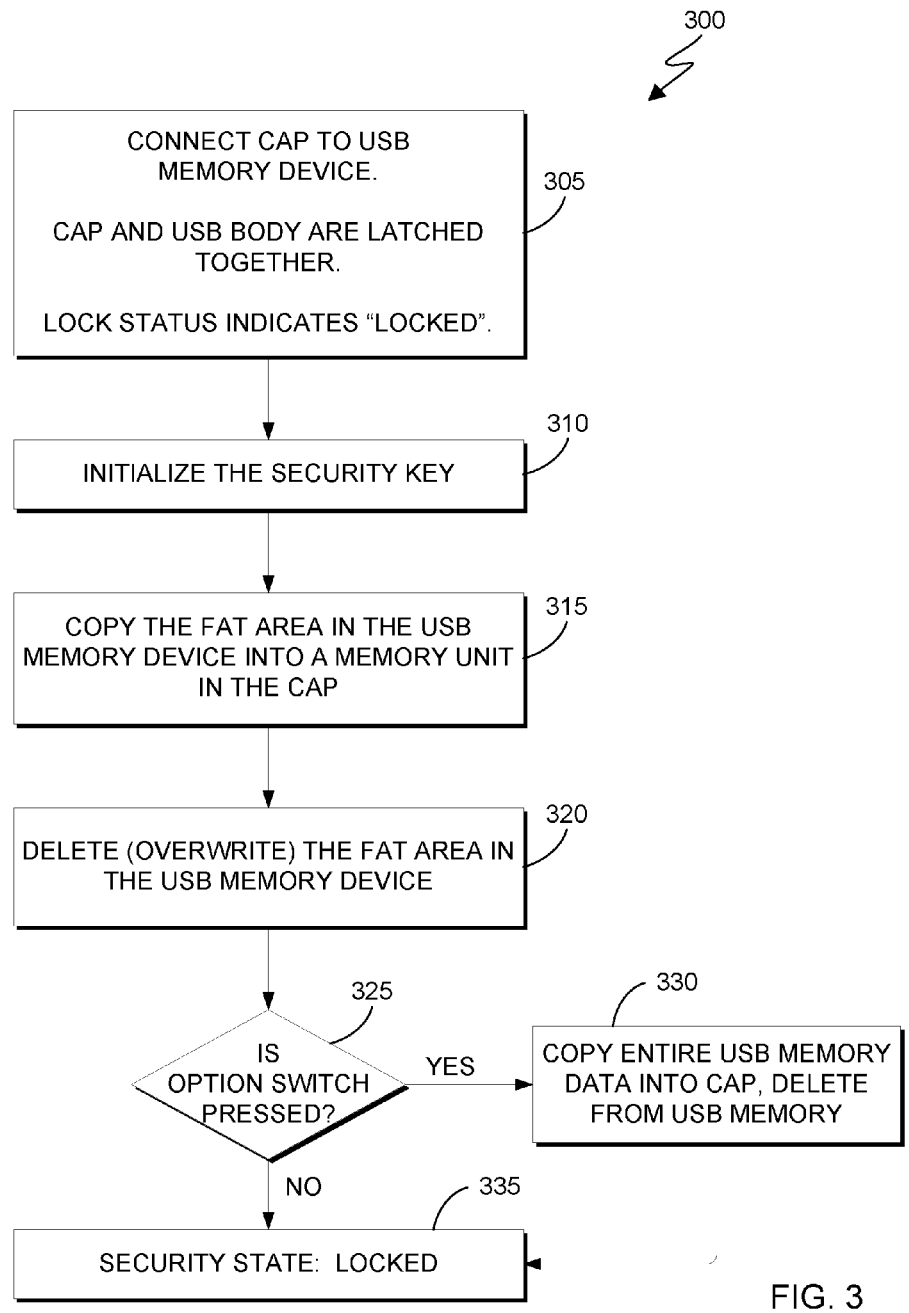
FIG. 3 is a flowchart depicting a method for securing data in accordance with some embodiments of the present invention.

Processing proceeds at operation 240 where security module 135 receives the user response to the security challenge. The security module determines (245) if the user response is a correct response. If the user response is correct (decision 245, "Yes" branch), the security module restores the data map to the flash drive (250). In some embodiments of the present invention, if the user response is not correct (decision 245, "No" branch), the security module deletes the data map from the second storage device (255). In some embodiments of the present invention, the user is allowed a pre-determined number of incorrect attempts before the drastic measure of deleting the data map occurs. For simplicity, that aspect is not illustrated in Flowchart 2B Flowchart 300 of FIG. 3 depicts a data securement method performed by a data security system in accordance with some embodiments of the present invention. In the embodiment of flowchart 300, the method of flowchart 300 comprises: (i) a USB flash drive (or other type of storage device); (ii) a cap (or other type of security device) that fits onto the flash drive and physically blocks external access to the electrical connector of the flash drive; (iii) a latching feature that locks the cap in place. In other embodiments, the storage device may be a conventional hard drive, an optical drive, a tape cartridge, etc. In some embodiments of the present invention, the security device can be disabled (meaning it no longer blocks access to the storage device's electrical connector) by entry of a correct (valid) security key. In some embodiments, if the latching feature is broken (for example by attempts to disable it by force), the data map is automatically deleted, making unusable the corresponding data, and therefore permanently securing the flash drive data. The data security system will be discussed in further detail below, with reference to FIGS. 5A and 5B.

In the method of flowchart 300, processing begins at operation 305. A cap is connected to the body of a USB memory device (also referred to herein as a flash drive) the two are latched together and a status indicator indicates "Locked". A security key is established (310) and the file allocation table (FAT) (or other data map corresponding to data on the flash drive) is copied into the cap (315). The FAT is securely deleted from the flash drive (320), rendering the data thereon unusable.

In the embodiment method of flowchart 300, there is provided an option switch (not shown in the Figures; the switch may be implemented in hardware and/or software) by which a user indicates whether or not the data (in addition to the FAT) of the memory device is to be offloaded from the flash drive to the cap. If so indicated by user input (325, "Yes" branch), the entire flash drive memory is copied into the cap (330). Processing ends with the flash drive in a locked state (335), meaning the data is unusable.

Figure 4:
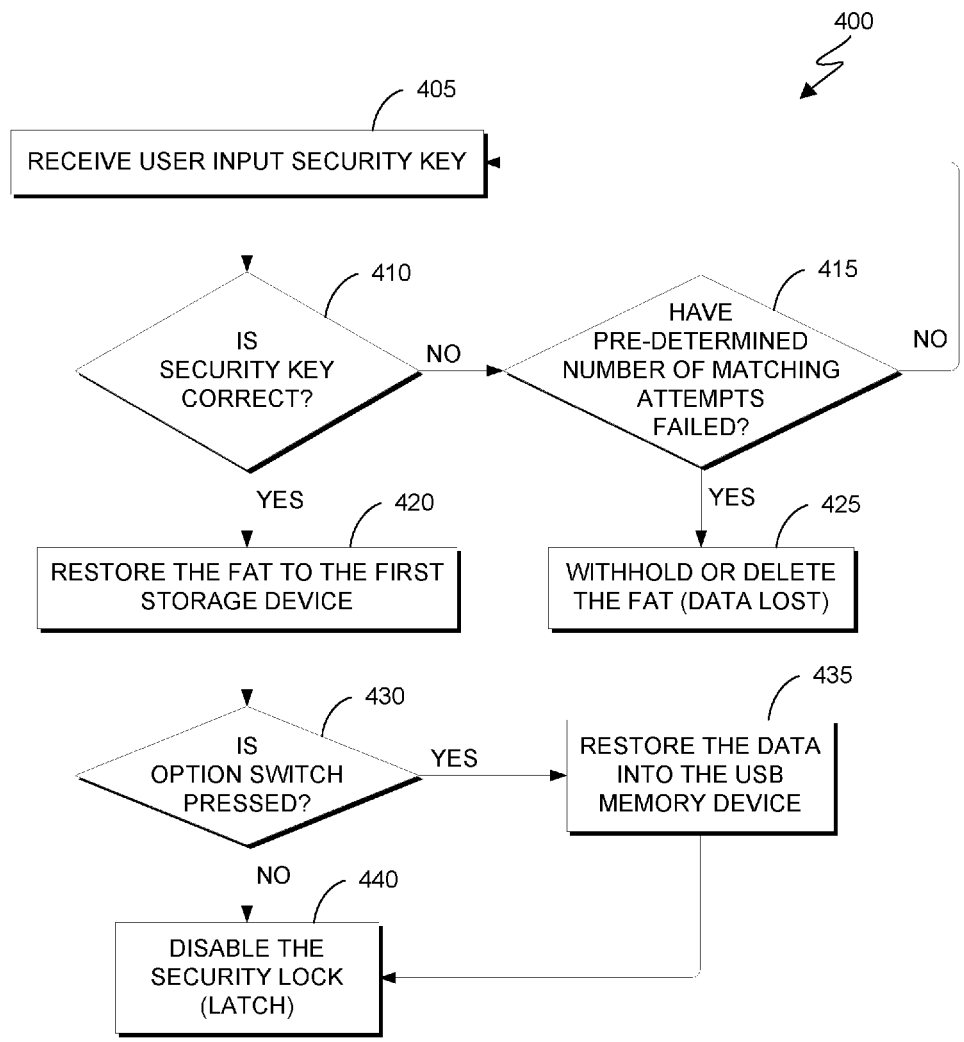
FIG. 4 is a flowchart depicting a data restoration or access disablement method in accordance with some embodiments of the present invention.

Flowchart 400 of FIG. 4 depicts a data restoration or protection method performed by a data security system in accordance with some embodiments of the present invention. Processing begins at operation 405 where a security device (in this embodiment, the security device is, but not necessarily, a cap corresponding to a USB flash drive) receives a security key through a user interface. The data security system proceeds to evaluate the security key. If the security key evaluated and found to be correct (valid) (decision 410, "Yes" branch), the FAT is restored (420) to the corresponding storage device (in this embodiment, the USB flash drive). In some embodiments, there is allowed a pre-determined number of failed attempts at providing the security key. There can be allowed any number failed attempts. In a strictest instance, the number of failed attempts can be set at 0 (zero), in which case, input of an incorrect security key immediately results of loss of the FAT and/or data). If the security key is not correct (decision 410, "No" branch), the security system determines (decision 415) whether the number of failed attempts exceeds the pre-determined threshold. If the pre-determined threshold has not been reached (decision 415, "No" branch), the user is presented with another opportunity to input the security key. If the threshold has been reached (decision 415, "Yes" branch), the FAT is not transferred from the secondary storage device (the USB flash drive cap) to the primary storage device (the USB flash drive). In some embodiments of the present invention, if the threshold has been reached, the FAT is securely deleted from the cap.

In this embodiment, there is provided an option switch (not shown in the Figures; the switch may be implemented in hardware, software, and/or coded in memory) by which a user indicates (or has indicated) whether or not the data (in addition to the FAT) of the memory device has been offloaded from the flash drive to the cap. In some embodiments of the present invention, the security system requires user input to determine if the data (in addition to the FAT) is on the secondary storage device. In other embodiments, coding is recorded on the secondary memory device, to automatically indicate whether the data (in addition to the FAT) is on the secondary storage device.

Without regard as to whether the option switch requires user input or is coded in software and/or memory, if the option switch indicates the data (in addition to the FAT) is on the secondary storage device (decision 430, "Yes" branch), the data is restored into the primary memory device (435), and the security lock is disabled (440), meaning any physical block preventing access to the primary storage device is removed. If the option switch indicates the data is not on the secondary storage device (decision 430, "No" branch), the security lock is disabled (440).

Figure 5A:
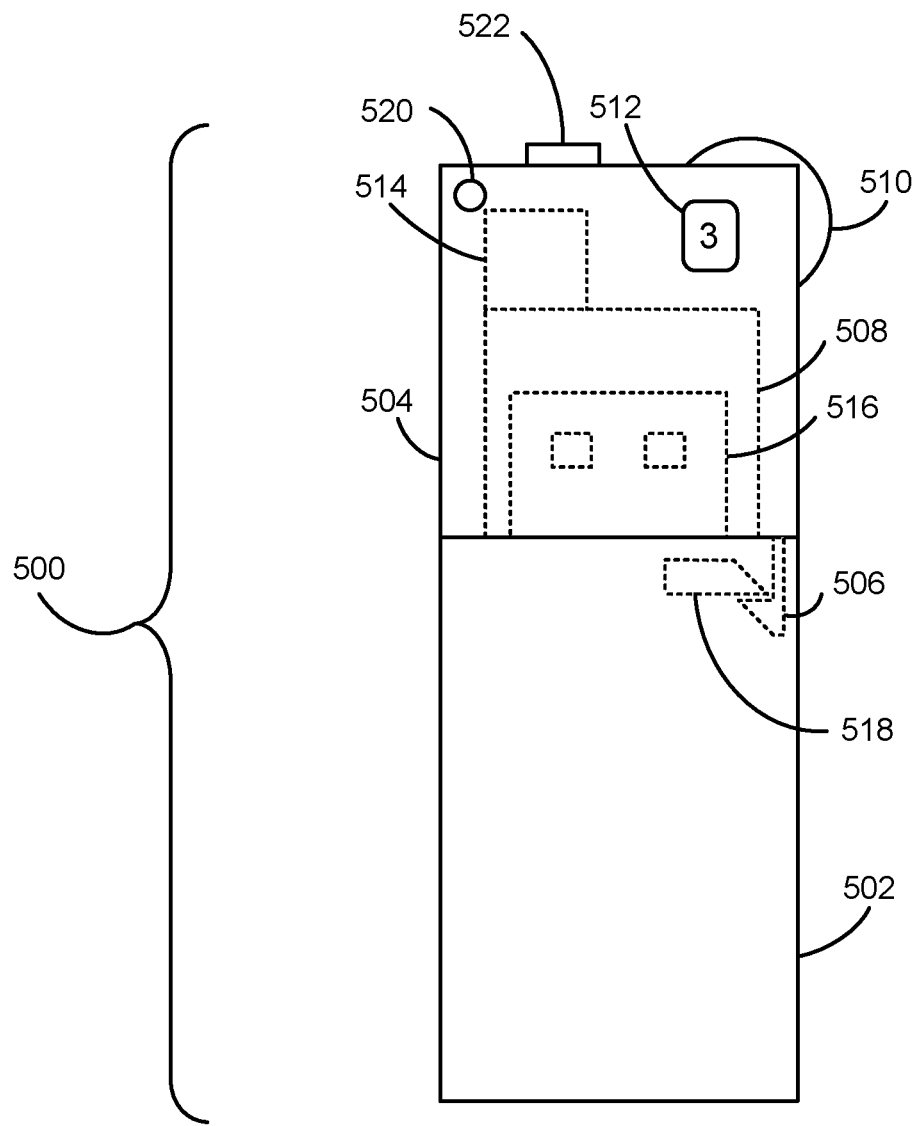
FIG. 5A is a view of a data security system in accordance with some embodiments of the present invention.

FIG. 5A is a view of data security system 500, comprising USB flash drive 502 (a primary storage device) in physically locked engagement and electrically coupled with cap 504 (a secondary storage device, also sometimes herein referred to as a security device) in accordance with some embodiments of the present invention;

In the embodiment of FIG. 5A, USB flash drive 502 includes USB connector 516, and keeper 518. Cap 504 includes: latch 506; USB socket 508; selector dial 510; viewing window 512; security processor 514; status indicator 520, and user input button 522.

Security processor 514 includes the following components: (i) a security controller (for example, a microprocessor type device); (ii) a memory section; and (iii) a battery or other power source (such as a photovoltaic cell). None of the components of security processor 514 are separately shown in the Figures.

Selector dial 510, viewing window 512, status indicator 520, and user input button 522 comprise a user interface with which a user can establish and/or enter a security key.

In this embodiment, status indicator 520 is a light emitting diode (LED) for conveying to a user the status of data security system 500. Various possible status indications include: (i) prompting for user input; (ii) acceptance of a correct security key input; (iii) rejection of an incorrect security key input; (iv) locked or unlocked status of the latching mechanism; (v) data is secured; (vi) data is unsecured; (vii) tampering has been detected; (viii) battery low; (ix) tampering was detected; and (x) system malfunction. In alternative embodiments, status indicator 520 may be a liquid crystal display (LCD), an acoustic emitter (for example a clicker, beeper, or buzzer) or a tactile type of annunciator (for example a vibrator such as is typically used in cell phones) or a combination of two or more types of indicators.

Figure 5B:
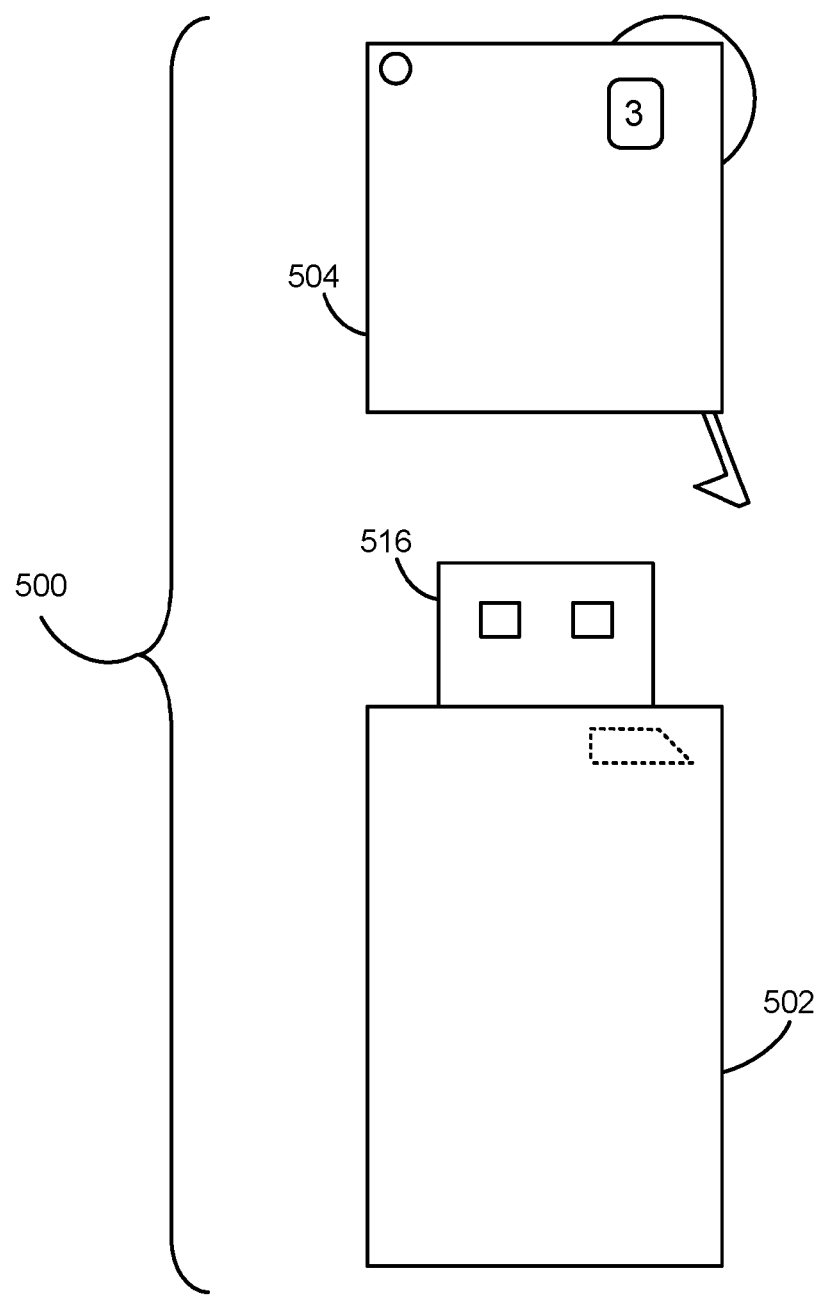
FIG. 5B is a view of a data security system in accordance with some embodiments of the present invention.

In the embodiment of FIGS. 5A and 5B, selector dial 510 is a means for providing user input, such as setting and/or inputting a security key. Various markings, for example numeric digits from 0 through 9, show through viewing window 512 as the dial is turned. A user inputs a security key by turning the selector dial until the first character of the security key appears in the viewing window. The operator then presses input button 522. The user repeats the process (selecting a character, pressing the button) with each subsequent character of the security key until the whole key has been input.

In some embodiments of the present invention, when cap 504 is properly fitted onto USB flash drive 502: (i) external access to the electrical connections (through which data on the USB flash drive is typically accessed), is physically blocked; (ii) the cap becomes operationally coupled with the flash drive, enabling data communication between the cap and flash drive; and/or (iii) latch 506 engages with keeper 518 to deter unauthorized removal of the cap from the flash drive. Under proper conditions, (for example after receipt, by security device 504, of a correct security key), the latch and keeper disengage, enabling removal of the cap from the USB flash drive. Further with respect to item (ii) in the list above, in alternative embodiments, data communication may be established wirelessly between the cap and the flash drive, for example through near field communication.

In some embodiments of the present invention, forcible disengagement of cap 504 from USB flash drive 502, breaks latch 506. The breakage is detected by the "controller" component of security processor 514. On detecting the breakage, the controller automatically deletes the FAT and/or data stored in the "memory" component of the security processor, thereby: (i) rendering unusable, data on the flash drive; and (ii) effectively permanently securing flash drive data from unauthorized access.

FIG. 5B is a view of data security system 500, comprising USB flash drive 502 disengaged from cap 504 (a secondary storage device, also sometimes herein referred to as a security device) in accordance with some embodiments of the present invention.

Figure 6A:
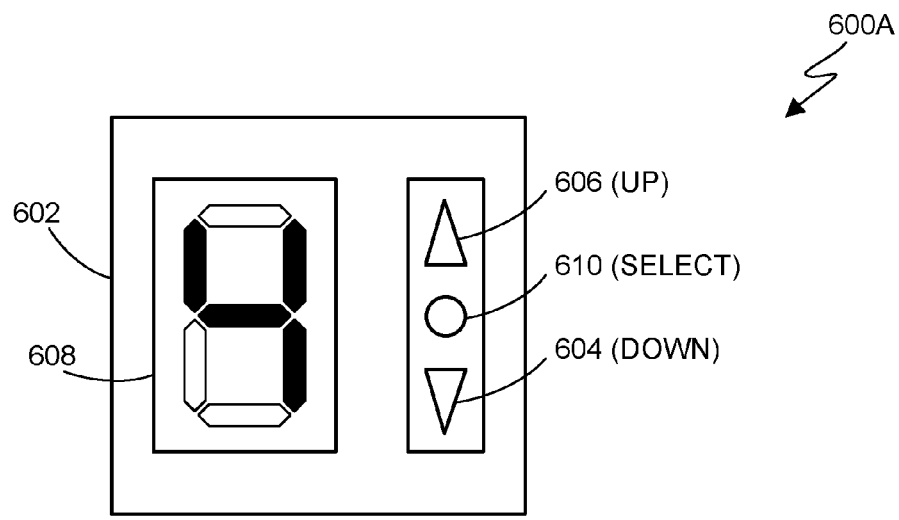
FIG. 6A is a view of a security device user interface in accordance with some embodiments of the present invention.

FIG. 6A is a view of a security device user interface 600A in accordance with some embodiments of the present invention. User interface 600A, in this embodiment, is integrated with cap 602, and includes: LCD display 608 (display of the numeral "4" is depicted in the Figure); "down" button 604; "up" button 606; and "select" button 610. To enter a security key into the data security system, in this embodiment, a user can: (i) press the "up" or "down" buttons until a desired digit is displayed by the LCD display; (ii) push the "select" button to trigger entry of the digit into the data security system; and (iii) repeat steps (i) and (ii) for each successive digit of the security key until the entire key has been entered.

Figure 6B:
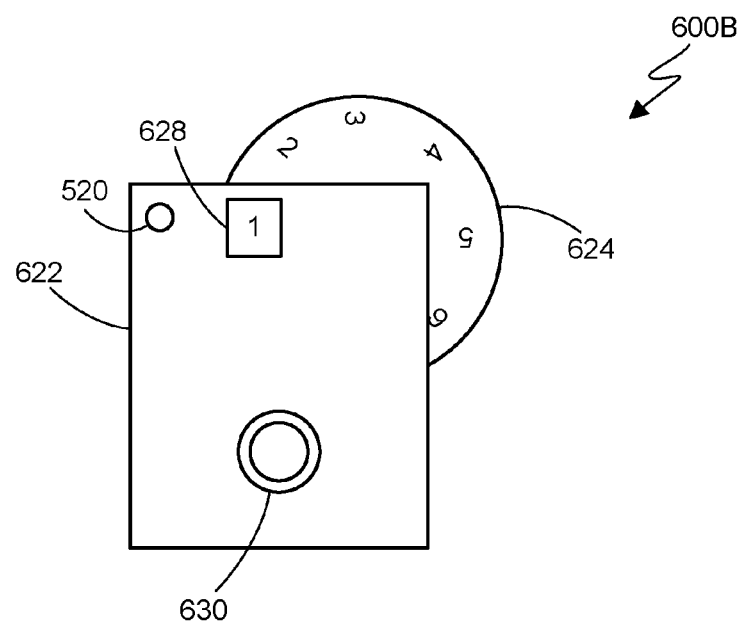
FIG. 6B is a view of a security device user interface in accordance with some embodiments of the present invention.

FIG. 6B is a view of a security device user interface in accordance with some embodiments of the present invention. User interface 600B, in this embodiment, is integrated with cap 622, and includes: status indicator 520 (see FIG. 5A); selector dial 624; viewing window 628 and "select" button 630. To enter a security key into the data security system in this embodiment, a user can: (i) turn the selector dial until a desired digit is displayed by the viewing window; (ii) push the "select" button to trigger entry of the digit into the data security system; and (iii) repeat steps (i) and (ii) for each successive digit of the security key until the entire key has been entered.

Alternatively, there are many other types of user interface possible in various embodiments of the present invention. In some embodiments, the primary storage device communicates (for example, through wireless and/or optical communication) with a software application running on a smartphone (not shown in the Figures). The smartphone acts as the user interface, both displaying messages to the user and accepting input from the user. In some embodiments, the smartphone is the secondary storage device to or from which the data map (for example the file allocation table) of the primary storage device is transferred or restored. In still other embodiments, a first primary storage device may act as a secondary storage device for a second primary storage device. For example USB drive A may offload its file allocation table to USB drive B, under command from a smartphone, a computer, or through any other user interface.

In some embodiments of the present invention, for enhanced security, the data map is stored on secondary storage, in encrypted form. When it is restored to the primary storage device, with proper authorization, the data map is decrypted, making usable the corresponding data. If the data map is restored to the primary storage device without having been properly decrypted, the data map does not properly map the corresponding data.

Figures 7A, 7B:
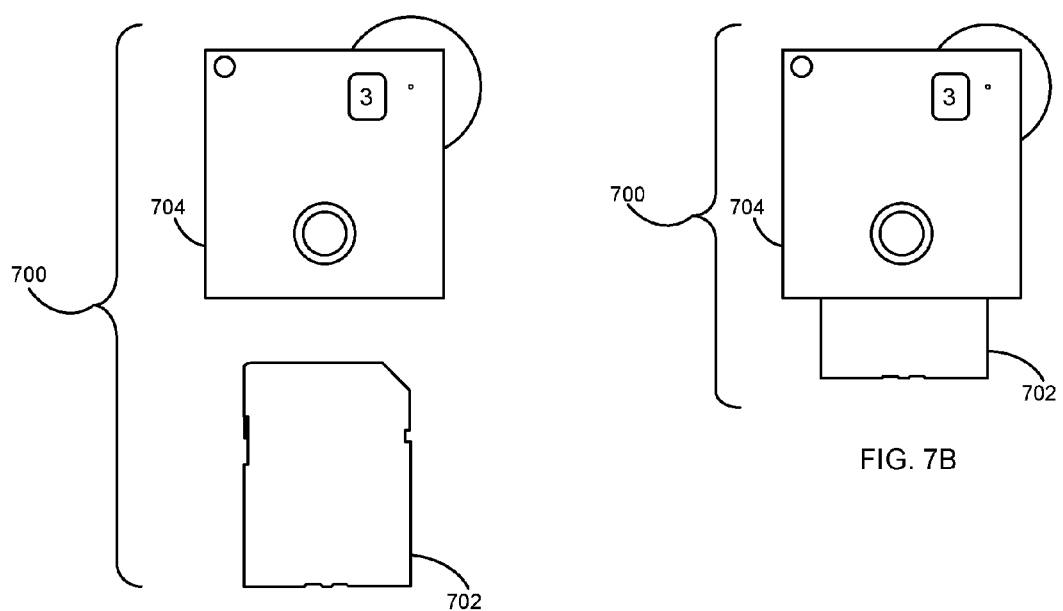
FIG. 7A is a view of a data security system in accordance with some embodiments of the present invention.
FIG. 7B is a view of a data security system in accordance with some embodiments of the present invention.

FIGS. 7A and 7B are views of a data security system 700 in accordance with some embodiments of the present invention. Data security system 700 includes: secure digital card 702 (SD card 702); and (ii) SD card reader 704, configured to act as a security device with respect to an SD card. In the view of FIG. 7A, the SD card and the security device are separated. In the view of FIG. 7B, the SD card is mated, and in communication with, the security device. Operations of security system 700 are performed in a manner the same as, or similar to, other embodiments of the present invention discussed above, with reference to FIGS. 1 through 6.

Figure 8:
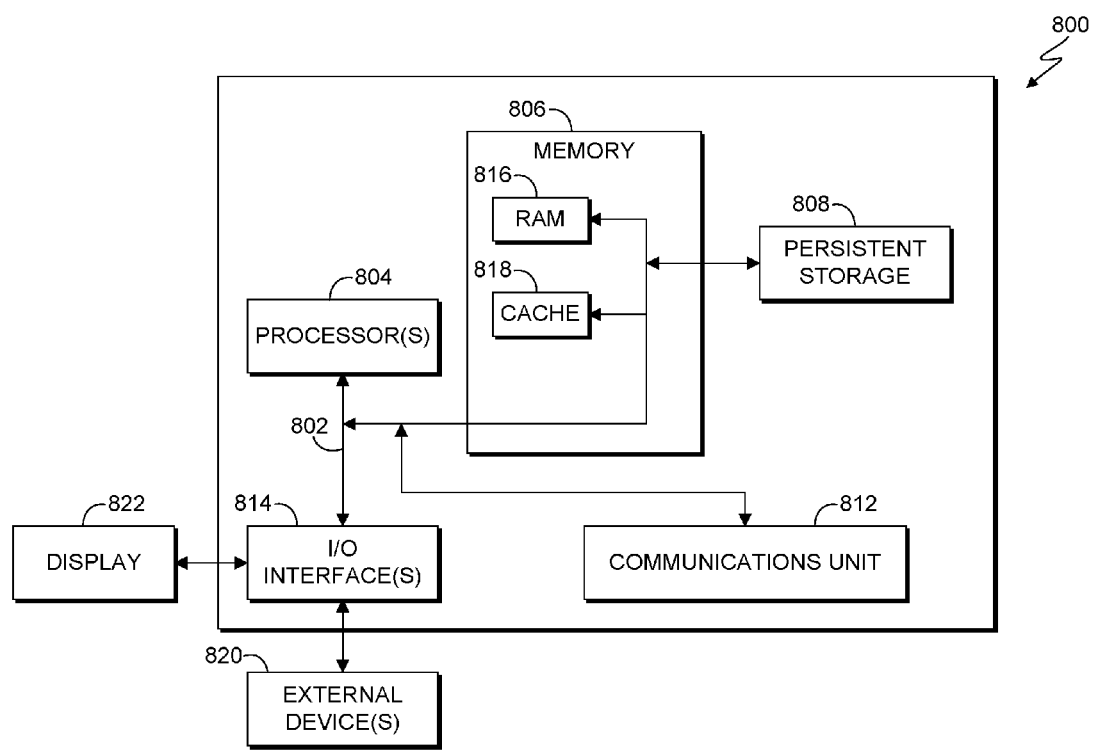
FIG. 8 depicts a block diagram of components of a computer, in accordance with some embodiments of the present invention.

FIG. 8 depicts a block diagram of components of computer 800 in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

As depicted, the computer 800 includes communications fabric 802, which provides communications between computer processor(s) 804, memory 806, persistent storage 808, communications unit 812, and input/output (I/O) interface(s) 814. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 816 and cache memory 818. In general, memory 806 can include any suitable volatile or non-volatile computer-readable storage media.

One or more programs may be stored in persistent storage 808 for access and/or execution by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 812, in these examples, provides for communications with other data processing systems or devices. In these examples, communications unit 812 includes one or more network interface cards. Communications unit 812 may provide communications through the use of either or both physical and wireless communications links.

I/O interface(s) 814 allows for input and output of data with other devices that may be connected to computer 800. For example, I/O interface 814 may provide a connection to external devices 820 such as a keyboard, keypad, a touch screen, and/or some other suitable input device. External devices 820 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 808 via I/O interface(s) 814. I/O interface(s) 814 also connect to a display 822.

Display 822 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

What is claimed is:

1. A method for protecting data in a first storage device, the method comprising:
    copying a data map of a first storage device to a second storage device;
    establishing a security key corresponding to the data map on the second storage device; and
    deleting the data map from the first storage device;
    wherein:
        the first storage device is a body portion of a universal serial bus flash drive (USB flash drive),
        the second storage device is a detachable cap portion of the USB flash drive, and
        the data map is a file allocation table corresponding to at least one data file stored on the first storage device.

2. The method of claim 1 further comprising:
    receiving a request to restore the data map to the first storage device.

3. The method of claim 1 further comprising:
    issuing a security challenge.

4. The method of claim 3 further comprising:
    receiving a user response to the security challenge.

5. The method of claim 4 further comprising:
on condition that the user response to the security challenge is a correct response, restoring the data map to the first storage device; and
on condition that the user response to the security challenge includes a pre-determined number of incorrect responses, deleting the data map from the second storage device.

6. An apparatus comprising:
a communication module configured to establish communication between a first storage device and a second storage device;
a copy module configured to: (i) copy a data map of the first storage device to the second storage device, and (ii) initiate deletion of the data map from the first storage device; and
a security module configured to establish a security key corresponding to the data map on the second storage device;
wherein:
the first storage device is a body portion of a universal serial bus flash drive (USB flash drive),
the second storage device is a detachable cap portion of the USB flash drive, and
the data map is a file allocation table corresponding to at least one data file stored on the first storage device.

7. The apparatus of claim 6 further comprising a user interface module configured to:
display a security status to a user;
prompt the user for a security key; and
receive user input.

8. The apparatus of claim 6 wherein the second storage device comprises a non-volatile memory.

9. The apparatus of claim 6 wherein the security module is further configured to issue a security challenge.

10. The apparatus of claim 9 wherein:
the security module is further configured to initiate restoration of the data map to the first storage device in response to a correct user response to the security challenge; and
the security module is further configured to delete the data map from the second storage device in response to a pre-determined number of incorrect user responses to the security challenge.

11. The apparatus of claim 6 wherein the copy module is further configured to provide the data map to the first storage device in response to reception of a valid security key.

12. A system for protecting data in a first storage device, the system comprising:
a first storage device configured to store at least one data file, and a data map corresponding to the at least one data file; and
a security device configured to: (i) establish communication between the first storage device and a second storage device, (ii) copy the data map to a second storage device, (iii) initiate deletion of the data map from the first storage device, and (iv) establish a security key corresponding to the data map on the second storage device;
wherein:
the first storage device is a body portion of a universal serial bus flash drive (USB flash drive),
the second storage device is a detachable cap portion of the USB flash drive, and
the data map is a file allocation table corresponding to the at least one data file stored on the first storage device.

13. The system of claim 12 wherein the security device is further configured to: (i) receive a request to restore the data map to the first storage device; (ii) prompt a user to input a security key; (iii) receive the security key; (iv) evaluate the security key; and (v) on condition that the security key is a correct security key, restore the data map to the first storage device.

* * * * *